United States Patent [19]

Groom

[11] 4,093,021

[45] June 6, 1978

[54] INSTRUMENT AND PANEL COOLING APPARATUS

[75] Inventor: Kenneth Dale Groom, Kent, Wash.

[73] Assignee: The Boeing Company, Seattle, Wash.

[21] Appl. No.: 645,140

[22] Filed: Dec. 29, 1975

[51] Int. Cl.² .......................... F28F 9/22; F28F 13/12
[52] U.S. Cl. .......................................... 165/1; 62/418;
165/80; 165/126; 244/1 R; 248/27.1; 357/82; 361/384
[58] Field of Search ........... 317/100; 174/15 R, 16 R; 244/1 R; 361/383, 384; 357/82; 62/418; 165/80, 122, 126, 1; 248/27.1, 27.3

[56] References Cited

U.S. PATENT DOCUMENTS

| 2,013,264 | 9/1935 | Buder | 62/418 |
|---|---|---|---|
| 2,241,558 | 5/1941 | Read | 62/418 |
| 2,394,060 | 2/1946 | Holmes | 361/384 |
| 2,555,691 | 6/1951 | Hamby | 174/16 R X |
| 3,115,019 | 12/1963 | Rutishauser | 62/418 |
| 3,192,306 | 6/1965 | Skonnord | 317/100 X |
| 3,196,317 | 7/1965 | Potter et al. | 317/100 |
| 3,209,062 | 9/1965 | Scholz | 357/82 |
| 3,298,195 | 1/1967 | Raskhodoff | 62/418 |
| 3,462,553 | 8/1969 | Spranger | 317/100 X |
| 3,541,395 | 11/1970 | Lucchino | 317/100 |
| 3,608,280 | 9/1971 | Martin | 174/16 R X |
| 3,778,551 | 12/1973 | Grodinsky | 361/384 |
| 3,967,874 | 7/1976 | Calabro | 317/100 |

OTHER PUBLICATIONS

Machine Base, R. J. Lindner, IBM Technical Disclosure Bulletin vol. 16, No. 3, Aug. 1973, p. 905.
Turbulator for Air-Cooling Arrangements, R. C. Chu et al., IBM Technical Disclosure, vol. 14, No. 11, Apr. 1972, pp. 3555-3556.
Flexible Cabinets & Components, Western Devices, Inc., 8-56.

Primary Examiner—Charles J. Myhre
Assistant Examiner—Sheldon Richter
Attorney, Agent, or Firm—Conrad O. Gardner; B. A. Donahue; Daniel T. Anderson

[57] ABSTRACT

In the disclosed aircraft instrument and panel cooling apparatus, each instrument is cooled uniformly and efficiently by air flowing through a plurality of small orifices which surround the large apertures in which the instruments are mounted. The orifices are preferably closely spaced around the instrument apertures with a distance between orifices of the order of two to four orifice diameters and located within a range of up to six orifice diameters from the instrument case so as to provide a plurality of cooling streams of air which tend to coalesce to provide a uniform and tailored sheet of air for maximum cooling efficiency.

11 Claims, 15 Drawing Figures

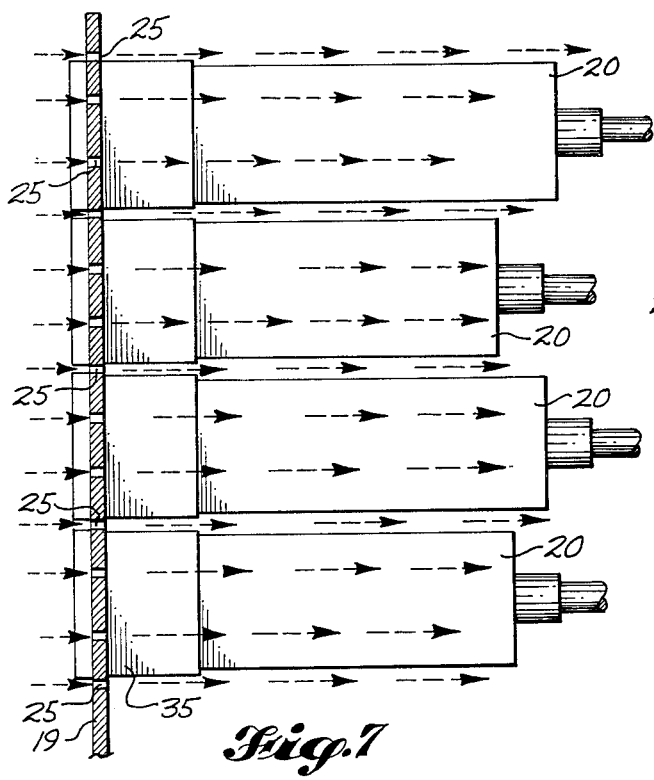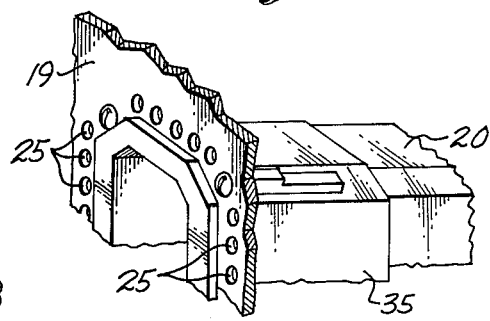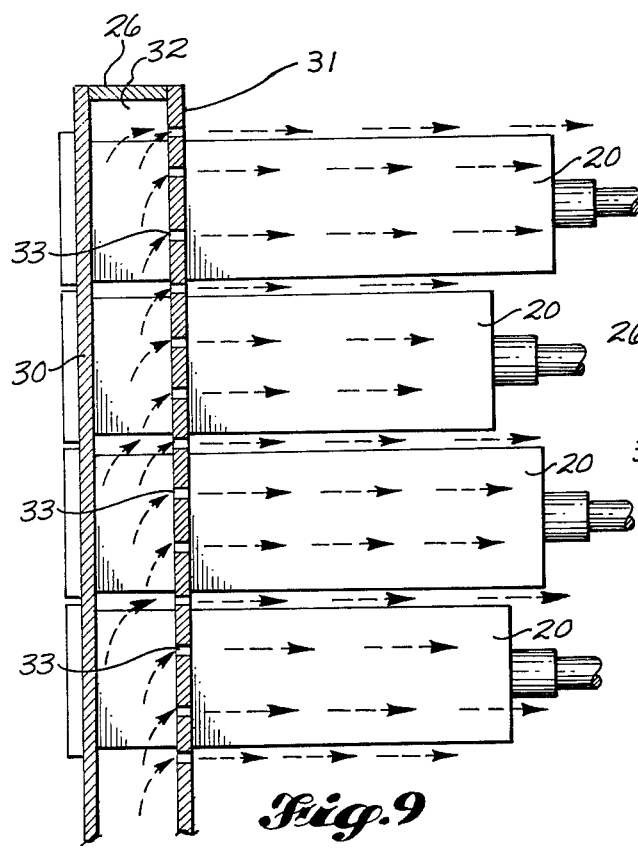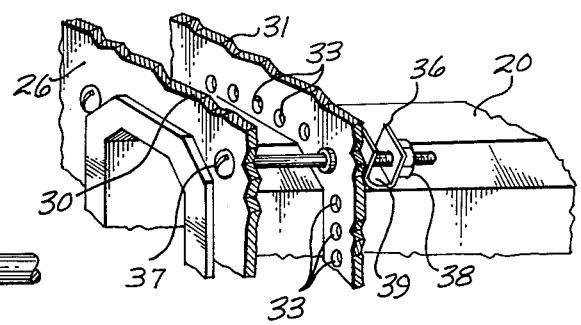

INSTRUMENT AND PANEL COOLING APPARATUS

BACKGROUND OF THE INVENTION

Major current problems in aircraft instrument cooling addressed by this invention include: (1) keeping panel mounted, closely spaced instruments adequately cool so that their function and reliability are not adversely affected by heat; and (2) keeping the temperature of the instrument panel surface within specified limits so that it is tolerable to touch and to prevent excessive amounts of heat from being radiated into the aircraft cabin and placing a burden on the cabin cooling system. These problems have now become acute for aircraft instrument panels. With the increased use of instrumentation for aircraft, there is a requirement to install more and more electronic instruments in a given panel area. Furthermore, the amount of heat generated by each instrument has generally increased as new and improved functions are added. This invention was motivated by these problems and the fact that new standards relating to permissible temperature levels have been imposed, as discussed below.

The most common current cooling technique for aircraft instrument panels is to induce airflow from the space in front of the panel, down and under the panel, and thence up and among the instrument cases projecting behind the panel. The resulting haphazard flow patterns produce non-uniform cooling. In particular, the instruments nearer the top of the panel are reached only by air already heated by the lower instruments, so that the higher instruments are often inadequately cooled. This condition persists in spite of any reasonable increases in airflow.

Special purpose cooling problems are prevalent in non-aircraft environments wherever electrical/electronic equipment is used. For example, U.S. Pat. No. 2,394,060 shows an equipment cabinet for housing electrical discharge devices of the type using enclosed, generally cylindrical envelopes of ionizable medium, such as mercury vapor. In order to promote condensation of the ionizable medium, a single stream of air is made to impinge radially onto the cylindrical surface of the enclosing envelope at the point at which it is desired to effect condensation. The discharge devices are mounted on the exterior side of a wall of a plenum chamber. The higher pressures of the plenum chamber cause a jet of air to pass through an opening in the wall to strike each device. Such localized cooling techniques are relatively ineffective with instruments which tend to generate heat over the entire length and periphery of the instrument case, as do most aircraft instruments. See also U.S. Pat. No. 3,192,306 which shows an electronic equipment rack using plenum chambers with outlet holes for selective delivery of single, relatively large streams of cooling air to specific regions in the rack.

SUMMARY OF THE INVENTION

The primary objective of this invention is to provide adequate cooling of an instrument panel and the instruments mounted in the panel. A related objective is that the cooling be highly efficient and predictable. Further related objectives are that the panel and instruments be cooled uniformly with minimum heat transfer to proximate instruments; that the amount of cooling flow to each instrument can be individually tailored; and that the apparatus be inexpensive, simple, and readily susceptible of integration into existing panel structures.

The foregoing and other objectives, which will become more apparent in the discussion which follows, are met by supplying cooling air flow through a plurality of small, specially designed and located orifices in the panel to each instrument to be cooled; the plurality of orifices being located close to and surrounding the large apertures in which the instruments are mounted so that cooling air is directed along and parallel to the longitudinal sides of the instrument case. Air flowing through the orifices tends to attach to each instrument case, cooling it adequately, efficiently, and uniformly. Each instrument is served by its own tailored supply of air, rather than by air previously heated by other instruments, so that the location of an instrument on the panel does not affect its cooling. The amount of air supplied to each instrument is tailored and controlled by the number, size, and location of the orifices for each instrument. At the flow rates used, and with the prescribed orifice sizing and location, the flow out of the orifices tends to coalesce into a sheet surrounding the instrument case and rapidly becomes turbulent. This improves the heat transfer between the air and instruments, increasing efficiency of the cooling. The structure is simple, requiring no specialized baffling or ducting. There are two preferred embodiments. In the first, the panel is a single wall, and the air is drawn through the orifices from the space in front of the panel. In the second embodiment, the panel has a dual wall which forms a plenum chamber, orifices being in the rear wall so that the front wall utilization is not hampered.

BRIEF DESCRIPTION OF THE DRAWINGS

FIG. 7 is a more detailed sectional view of the single wall embodiment.

FIG. 8 is a cutaway isometric illustration of the panel installation of FIG. 7.

FIG. 9 is a more detailed sectional view of the dual wall embodiment.

FIG. 10 is a cutaway isometric illustration of the panel installation of FIG. 9.

DESCRIPTION OF THE PREFERRED EMBODIMENTS

Figure 1:
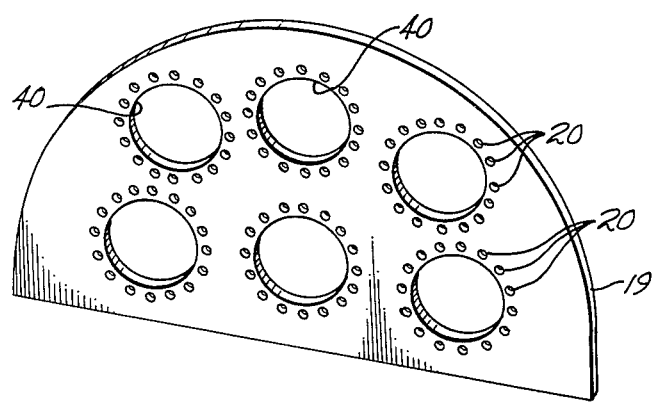
FIG. 1 is a perspective view from the rear of a single wall panel.

FIG. 1 shows a single wall panel embodiment of the subject invention wherein panel 19 contains instrument apertures 40 surrounded by cooling air orifices 25.

Figure 2:
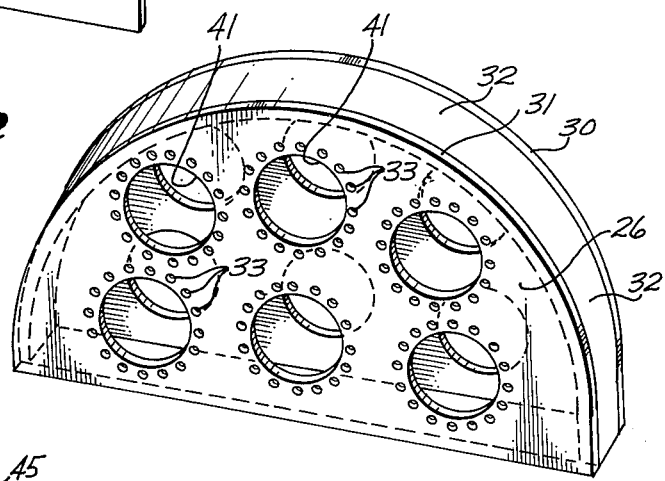
FIG. 2 is a perspective view from the rear of a dual wall panel.

FIG. 2 illustrates a panel assembly 26 of a dual wall embodiment which includes a front wall 30, a rear wall 31 and spacers 32. Cooling air orifices 33 are located in the rear wall 31, closely spaced around circular instrument apertures 41. This assembly 26, as explained in more detail below, serves as a plenum chamber, supplying cooling air through orifices 33 by either suction or pressure means.

Figure 3A:
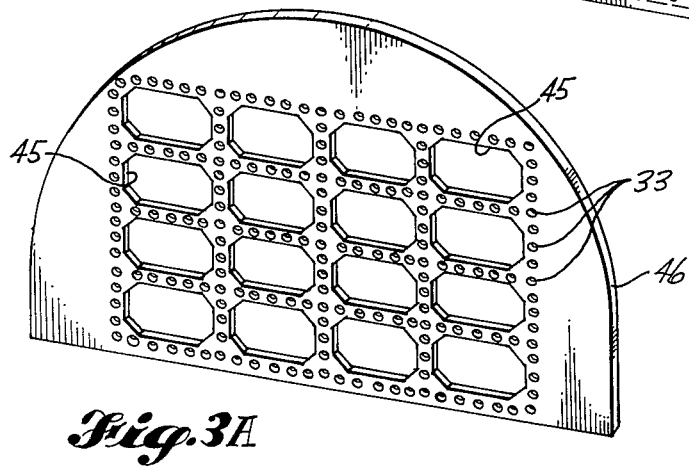
FIGS. 3a and 3b are perspective views from the rear, showing essentially rectangular shaped instruments in panels similar to those of FIGS. 1 and 2.

FIG. 3a illustrates a dense, matrix pattern arrangement of essentially rectangular instrument apertures 45 in panel 46 of a single wall panel embodiment of this invention. Cooling air orifices 33 are located around the pattern and there are single rows of orifices 33 between apertures 45.

Figure 3B:
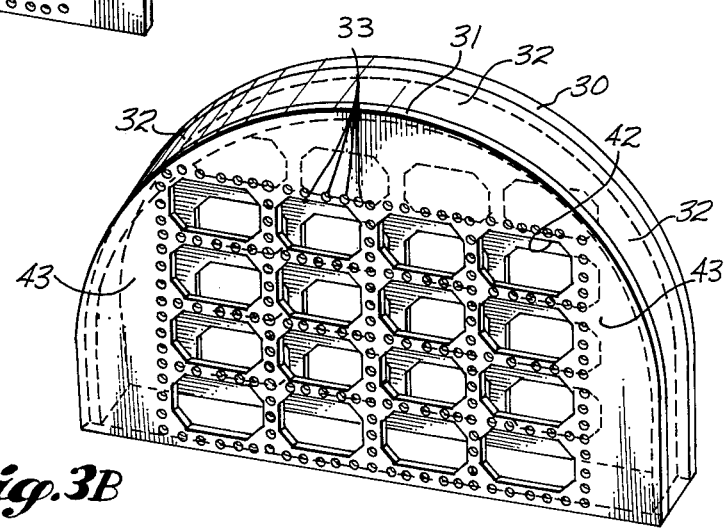

FIG. 3b also illustrates a dense, matrix pattern arrangement of essentially rectangular instrument apertures 42 in panel assembly 43 comprising a front wall 30, a rear wall 31, and spacers 32. The cooling air orifices 33 are located in rear wall 31 around the pattern and there are single rows of holes between apertures 42.

The orifices 33 are spaced close enough to each other around each aperture 42 so that their individual jet flows tend to coalesce into a sheet a short distance from the panel and close enough to the aperture so that the sheet attaches to the longitudinally extending surface of an instrument installed in an aperture. The FIGURES of the drawings have been simplified for ease of portrayal. The instruments fitting into apertures 42 are typically of the order of 2.2 inches by 2.2 inches (in cross-section) by 10 inches long. The orifices are of the order of ⅛ inch in diameter and are spaced about two to four orifice diameters apart. A typical number of orifices surrounding each aperture would be of the order of forty rather than twenty as shown. The centerlines of the orifices 33 are preferably one to six orifice diameters from the edge of the apertures 42.

It will be readily understood by persons skilled in this art that the precise orifice size and spacing are matters requiring consideration of the required amount of cooling for each instrument and/or panel and the amount of cooling air to be made available. If a given orifice diameter and spacing is found to provide sufficient cooling for a critical instrument in a closely grouped array of instruments, it may be desirable to maintain that diameter and spacing for the sake of uniformity even though somewhat more cooling than necessary is delivered to certain instruments. Of course, for maximum efficiency each instrument should have its own orifice sizing and spacing.

Figure 5:
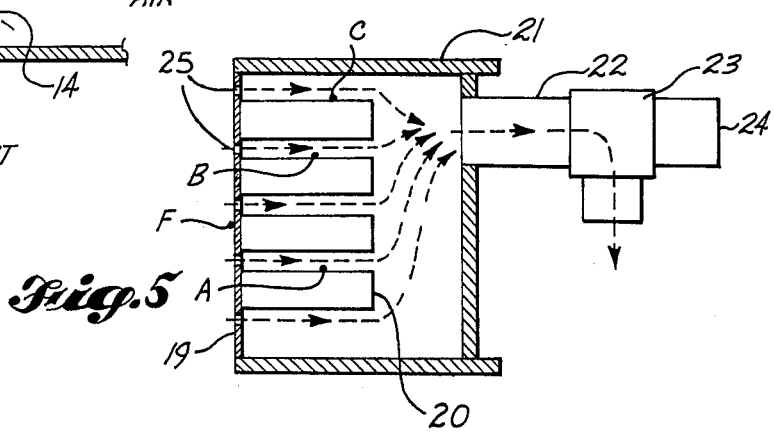
FIG. 5 is a schematic depiction similar to FIG. 4 showing the single wall embodiment of this invention.
Figure 6A:
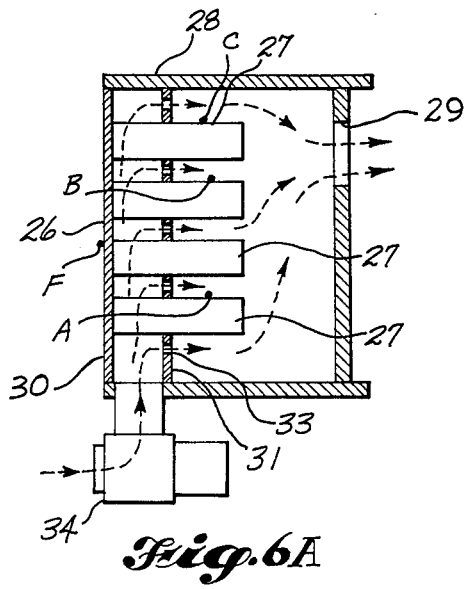
FIGS. 6a and 6b are schematic depictions similar to FIG. 5 illustrating the dual wall instrument panels of this invention.

As will be more apparent in the FIGURES and discussion which follows, cooling air is caused to flow along the panel, cooling it, and then through orifices 33 to cool the extending body of the instrument case (not shown in FIGS. 1-3, but see FIGS. 5 and 6).

Figure 4:
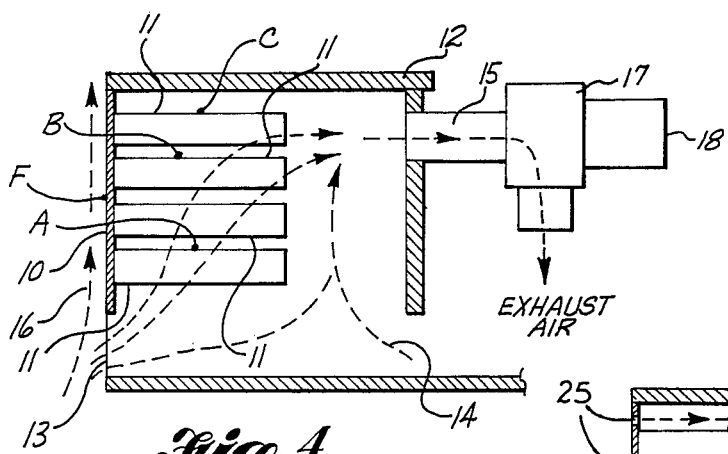
FIG. 4 is a schematic crossectional depiction of a typical prior art aircraft instrument panel installation and its cooling air flow.

FIG. 4 shows a typical prior art aircraft instrument panel and cooling installation comprising a panel 10, instruments 11, a partly enclosed housing 12, openings 13 and 14 into the housing, and an exhaust passage 15. Air is caused to flow through the inlets and housing, past the instruments, and out the exhaust passage as indicated by the dashed line arrows. The flow is caused by an exhaust fan 17 driven by electric motor 18. Low velocity, naturally induced flow occurs upwardly along the exterior face of panel 10 as indicated by dashed line arrow 16.

FIGS. 5, 7, and 8 show a single wall embodiment of the subject invention. The installation comprises a panel 19, instruments 20, and enclosing housing 21, an exhaust passage 22, and an exhaust fan 23 driven by electric motor 24. Orifices 25 are located around the apertures in which the instruments are mounted. The exhaust fan draws air through the orifices 25 along the surfaces of the instruments and out the exhaust passage 22.

Figure 6B:
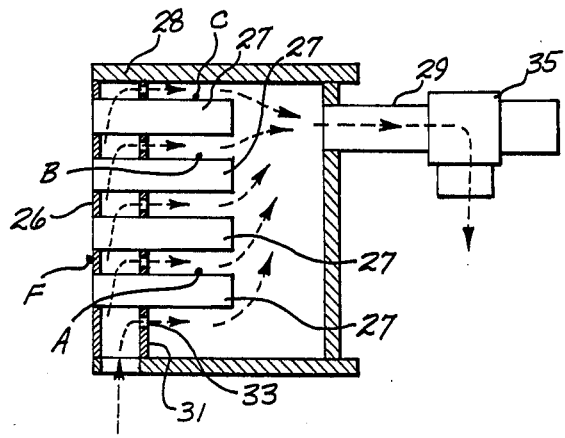

FIGS. 6a, 6b, 9, and 10 illustrate the dual wall embodiment comprising a panel assembly 26, instruments 27, housing 28, and exhaust passage 29. Panel assembly 26 comprises a front wall 30 and a rear wall 31. As indicated by the dashed lines and arrows, the cooling air flow enters the bottom of the panel assembly and exits through orifices 33 in the rear wall 31. It then flows along the instrument surfaces and out the exhaust passage 29. The flow can be caused by an electrically driven blower 34 (FIG. 6a) forcing air into the panel, or by an electrically driven exhaust fan 35 (FIG. 6b). If the blower is used, housing 28 can in some cases be eliminated, along with the associated exhaust passage 29, as illustrated in FIGS. 9 and 10.

In FIGS. 4, 5, and 6, the housings 12, 21, and 28 are shown as isolated structure. In practice in the aircraft environment, they may comprise part of the normal cabin structure and closure panels.

In FIGS. 7 and 8, the instruments are held in place on the single wall panel 19 with conventional clamps 35, which are well known in the art. These clamps serve to retain and align the instruments and are fairly complicated and delicate devices.

In FIGS. 9 and 10, clamps are not required with the dual wall panel 2, since the dual walls 30 and 31 perform the alignment function. The retention function is preferably done by a simple friction restraint device 36, one of which is shown in FIG. 10. As screw 37 is tightened onto nut 38, U-shaped spring 39 is deformed so that the distance from the screw to the bottom of the U section increases, forcing it against the instrument, locking it into place by the frictional forces between spring 39 and the instrument.

Figure 11:
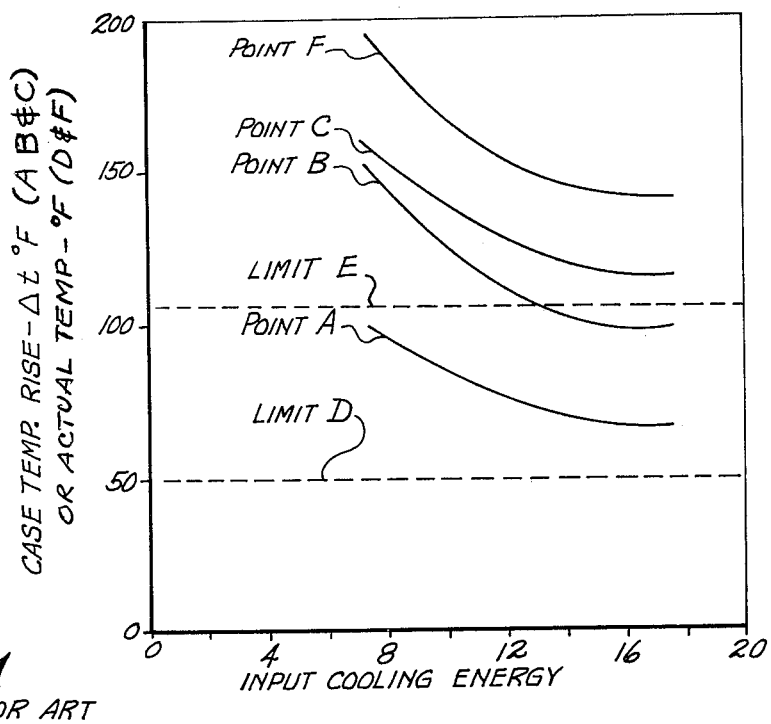
FIG. 11 is a graph of test results of a typical prior panel of the type shown in FIG. 4, showing various conditions.
Figure 12:
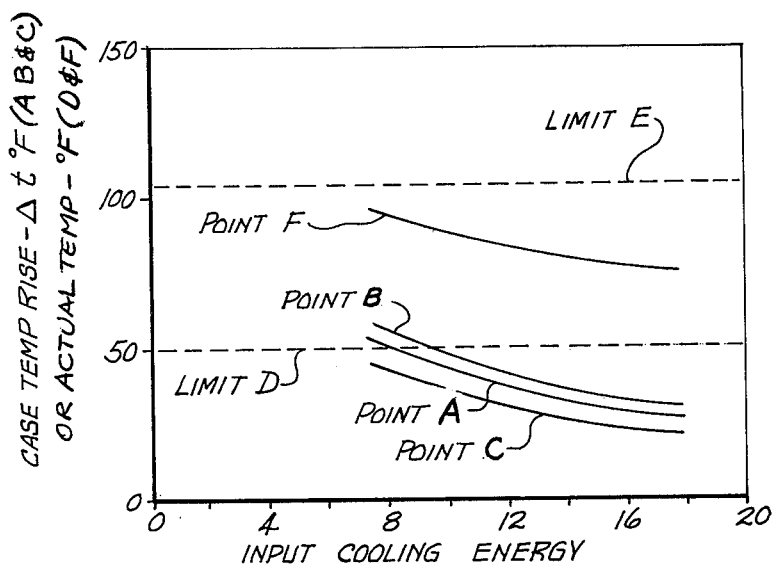
FIG. 12 is a graph similar to FIG. 11 of test results representative of either of the embodiments of this invention shown in FIGS. 5, 6a, or 6b.

FIGS. 11 and 12 graphically illustrate and compare the performance of a prior art system and the system of this invention, functioning under similar test conditions. The FIG. 11 data are from a prior art device of the type shown in FIG. 4. The FIG. 12 data are representative of both the FIGS. 5 and 6 embodiments of this invention. The total wattage generating heat in the instruments is 307 watts, with 19.2 watts per instrument and 16 instruments. The surface area of the instrument cases was such that 0.34 watts per square inch of surface was generated.

The abscissas of the graphs indicate input cooling energy power in terms of pounds of cooling air flowing per minute per kilowatt of total heat generation by the instruments. The left hand ordinates indicate the degrees Fahrenheit temperature rise of the instruments above ambient. Curves A, B, and C represent temperature measured on the instruments at points A, B, and C in FIGS. 5 and 6. Line D on each graph indicates the 50° F temperature rise limit for instruments set by Aeronautical Radio, Inc. (ARINC), a commercial company which serves the aircraft industry by establishing universally accepted standards on such matters. For satisfactory performance, curves A, B, and C should remain below limit line D.

Curves F represent temperatures measured on the face of the panel. Line E indicates the panel face temperature limit set at 105° F for 75° F ambient, according to a Military Specification MIL-E-38453A. For satisfactory performance, curve F should be below limit line E.

As can be seen by an examination of FIG. 11, in the prior art apparatus tested, the temperature rise in all instruments was above the ARINC limit (line D). Also, the curves appear to indicate that increasing cooling energy input will not bring the temperature rise within that limit, since the curves tend to flatten with increasing cooling. The temperature rise is, of course, highest for the top instrument (curve C). This is because the air reaching the higher instruments has already been heated by the lower instruments. Also, under the specified operating conditions, the temperature of the panel face (curve F) was not brought within the panel face temperature limit E.

FIG. 12 is representative of the test data on both of the described embodiments of this invention. It can be seen that the instrument surface temperature rises above ambient (A, B, and C) are within the ARINC limit (line D) for input energies of 9.5 pounds per minute KW and higher. It will also be noted that the panel face temperature is below the MIL-E-38453A specification 105° F limit (line E). Also, note that the temperature rises of all three instrument surfaces are closely grouped.

Figure 13:
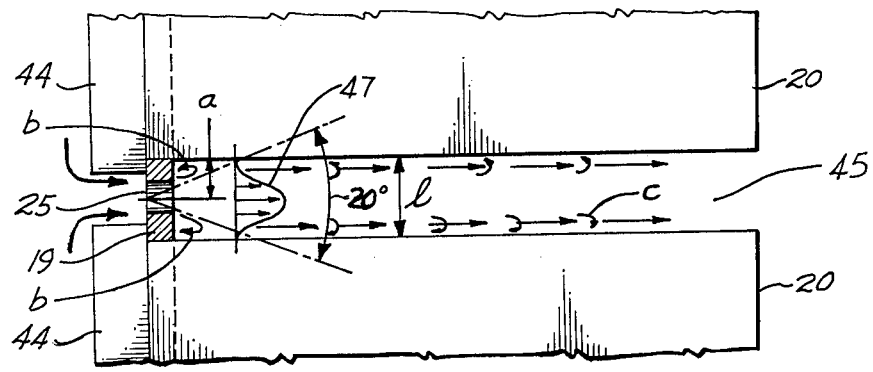
FIG. 13 illustrates details of the orifice location and size, and the airflow to the instrument cases.

FIG. 13 illustrates a significant factor in the achievement of the performance of the subject invention. Shown are the details around a typical orifice situated between two instruments 20 mounted in panel 19. The clamps are omitted for clarity. The air, as indicated by the arrows, is drawn from in front of and cools panel 19, and the instrument faces 44, as it flows along them. The air flows through orifice 25 and into the region 45 formed by the proximity of instruments 20. The center of orifice 25 is located a distance "a" from the surface of the instrument. Distance "a" should be less than six orifice diameters, and preferably is from one to three orifice diameters. The airjet from the orifice 25 normally spreads at an included angle of approximately 20°, as indicated on the drawing. The velocity profile of the airflow just after it leaves orifice 25 is schematically indicated by the plot of velocity vectors 47. Some reverse flow is generated behind the contact area, as indicated by arrows b. This arrangement tends to cause the flow along the instruments to become turbulent (as indicated by arrows c) at very low Reynolds numbers. The occurrence of turbulent flow significantly improves heat transfer coefficients as is well known to persons skilled in this art. In the testing performed on the embodiments of this invention, heat transfer coefficients of the order of magnitude normally associated with turbulent flow have been observed at Reynolds numbers much lower than expected.

The test data of FIGS. 11 and 12 indicates that the invention meets its primary objectives. Cooling is adequate, meeting the specified limits at reasonable energy inputs. The efficiency is improved since the instrument cooling is within limits at 9.5 pounds/min-KW cooling input whereas the prior art embodiment tested was inadequate at 17 pounds/min-KW. Cooling is uniform, as indicated by the close grouping of the instrument surface temperature rises. The structure is simple, involving no baffles or special ducting.

In the embodiment shown, all the instruments generate about the same amount of heat and the airflow is the same to each. In cases where the instruments generate different amounts of heat, the airflows can be tailored by spacing the orifices around the periphery of the instruments so that no more power than necessary is required to keep case temperatures within limits. If the flows are not tailored, the instruments generating less heat would be unnecessarily cooled. Cooling can be made uniform and predictable by using the teachings of this disclosure.

While preferred forms of this invention have been described, many modifications and variations are possible in light of the disclosures made herein. For example, it will be recognized that in some cases, oblong rather than circular orifices may be used to advantage. Also, the instrument accommodation volume may be larger and differently shaped than those shown schematically in the drawings. Therefore, this invention should be considered to be limited only by the scope of the appended claims.

What is claimed is:

1. A method of cooling an enclosed instrument panel and an instrument in an aperture in said panel comprising: inducing flow of a plurality of individual jets of cooling air near the face end of said instrument; providing spacing for and directing each of said individual jets of cooling air in a direction perpendicular to the face of said instrument in a manner for forming a cooling air flow path comprising a sheet a short distance from said panel and close enough to said aperture so that said sheet attaches to a surface of said instrument; and exhausting said cooling air from said enclosed instrument panel.

2. A method of cooling closely spaced, longitudinally elongated instruments having longitudinally extending surfaces disposed in an instrument panel array having an enclosed volume comprising: inducing cooling airflow through a plurality of small orifices surrounding each of said instruments to thereby form a plurality of jets of airflow around each instrument; spacing apart said jets of airflow by spacing apart said orifices with a distance between orifices of the order of two to four orifice diameters and positioning said orifices surrounding each of said instruments within a range of up to six orifice diameters from each of said instruments so as to direct said plurality of jets of airflow onto said longitudinally extending surfaces of each of said longitudinally elongated instruments thereby causing said plurality of jets surrounding each of said instruments to coalesce into a single sheet of air surrounding each of said instruments and thereafter becoming turbulent; and, exhausting said cooling air from said enclosed volume.

3. The combination of an instrument panel having a rear side and at lease one instrument having an instrument case, said instrument panel comprising a wall forming at least one large aperture for receiving said at least one instrument and forming a plurality of small orifices distributed close to and around said at least one aperture, and means to provide an air flow path through said orifices coalescing into a sheet surrounding said instrument case, then becoming turbulent, thereby improving heat transfer between said air flow path and said instrument case.

4. The combination according to claim 3 wherein said means to provide an airflow path through said orifices provides air jets extending from each of said orifices spreading at an included angle of about 20 degrees.

5. The instrument panel of claim 3 wherein said orifices are distributed around said aperture in a region within one to six orifice diameters of the edge of said at least one aperture.

6. The instrument panel of claim 5 wherein said orifices are spaced apart a distance of from two to four orifice diameters.

7. The combination of claim 1, wherein said at least one aperture comprises a plurality of large, essentially rectangular apertures positioned in a matrix pattern; and wherein said orifices are located around the outer periphery of said matrix pattern and also in single rows between said apertures.

8. The apparatus of claim 7 in which the centerlines of said orifices located around the outer periphery of said matrix pattern are spaced from said outer periphery by a distance approximately equal to the diameters of said orifices and the spacing between said apertures in said matrix pattern is approximately twice the diameters of said orifices in single rows between said apertures.

9. The apparatus of claim 3 in which said means to provide airflow comprises: an enclosure attached to the rear side of said panel, thereby defining instrument accommodation volume; means for housing a plurality of instruments; an exhaust passage connected to said accommodation volume; and an exhaust fan connected to said passage.

10. The apparatus of claim 9 in which said instrument accommodation volume means comprises: the structure to which said panel is attached; and top, bottom, and rear cover plates.

11. The apparatus of claim 9 wherein said wall forming said aperture and said orifices is located within said instrument accommodation volume means.

* * * * *